April 19, 1932. M. E. GOTTLIEB 1,854,932
REFLECTOR LAMP
Filed July 28, 1930
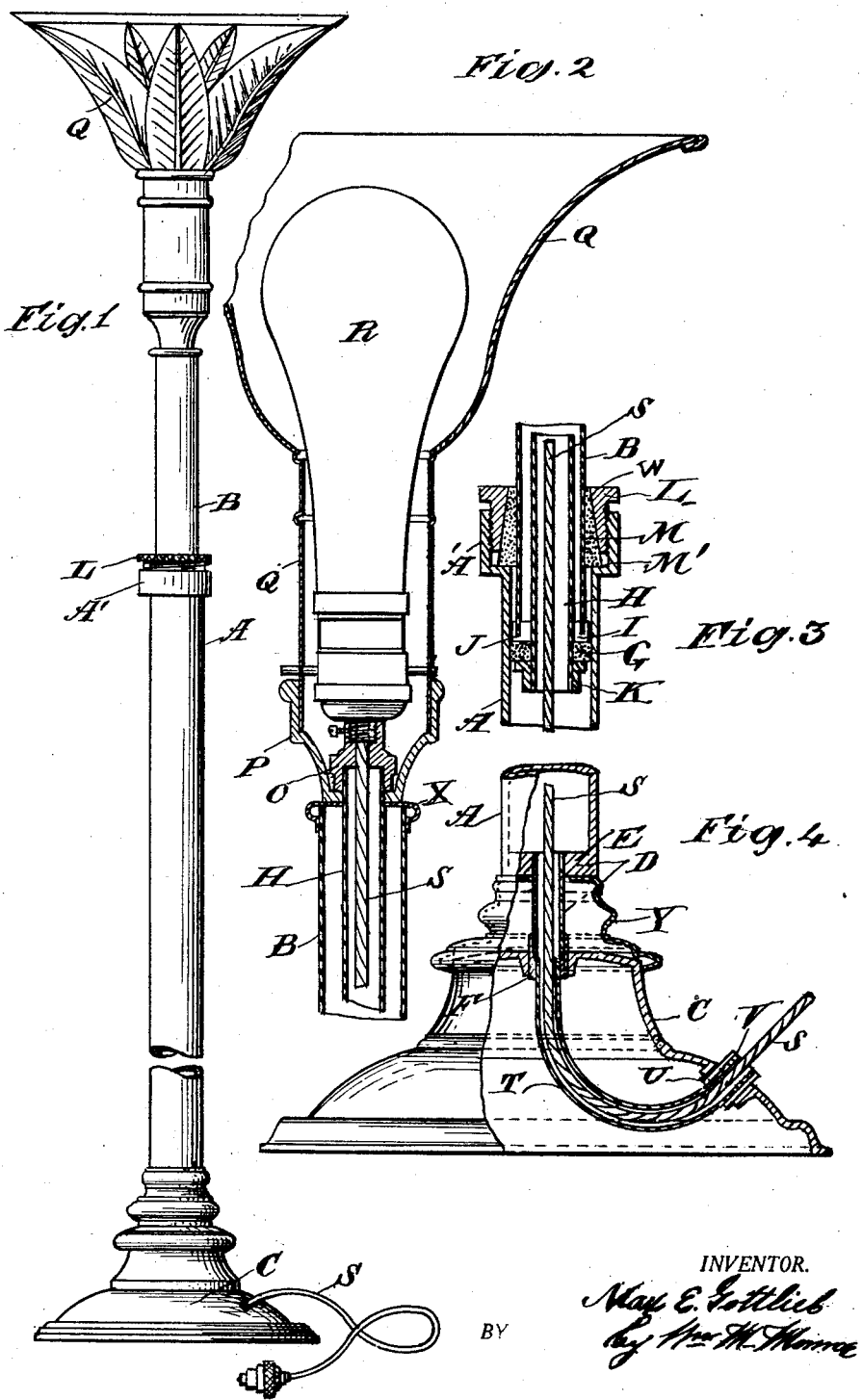
INVENTOR.
May E. Gottlieb
BY
ATTORNEY.

Patented Apr. 19, 1932

1,854,932

UNITED STATES PATENT OFFICE

MAX E. GOTTLIEB, OF CLEVELAND, OHIO

REFLECTOR LAMP

Application filed July 28, 1930. Serial No. 471,251.

The objects of the invention are to provide an improved collapsible electric lamp of the glow type and method of constructing the same in two unitary tubular sections telescoping together.

Through both of these portions the electric cord passes and a curved tube in the base member receives the cord and makes it possible for it to pass freely and laterally in and out of the lamp through the base, without friction as the lamp is adjusted for height.

The invention also includes vertically spaced guide bearings for the inner extremities of the inner section in the outer tube to give stability to the inner section when drawn out and to always maintain the parts in exact alinement with each other.

Further the bearings are constructed of compressible porous material such as felt, that is soft and resilient and will not mar or scratch the polished surface of the inner section, and the outer bearing is constructed with a tapered sleeve nut that can be laterally compressed against the inner lamp section and will retain it rigidly in place.

The upper end of the outer section is enlarged to enclose the structure of a tapered bearing and a conversely tapered nut or bushing therefor.

To accomplish these and other valuable results the invention further includes, the combination and arrangement of parts and construction of details, hereinafter more fully described, illustrated in the accompanying drawings and specifically pointed out in the claims.

In the accompanying drawings Fig. 1 is a side elevation of the complete lamp; Fig. 2 is an enlarged vertical section of the upper portion of the lamp showing the bulb socket, and means for connecting the same with the parts of the inner section; Fig. 3 is an enlarged section of the spaced bearings between the inner and outer lamp sections; Fig. 4 is an enlarged section of the base and lateral guide tube for the electric cord.

In these views A is a tube of metal forming the outer sections, B is the tubular inner section which telescopes into the outer section and C is the base which is rigidly connected with the outer section by means of the screw threaded tube D of less diameter, which engages within the metal disc or closure E, in the lower extremity of the outer tube, and with the coupling member F which is secured in the base member C thus clamping the parts rigidly together.

The inner tube B is guided at its lower end in the outer tube A by means of a washer or sleeve G, which is formed of soft resilient material and is preferably formed of felt that will keep its shape when in use.

This washer is mounted upon a tube H that connects all parts of the upper section together. This tube is inserted in an annular groove J in a head or closure I and the washer G is clamped between this head I and a nut K adjustable upon the lower end of the tube.

The washer G fits closely the inner surface of the outer tube and guides and supports the lower end of the upper tube at all elevations therein.

The upper extremity of the outer section is enlarged at A' and is internally screw threaded, and fitted with an internally tapered nut L, and a compressible sleeve washer M which is preferably composed of resilient and of soft porous material such as felt, and is outwardly tapered to correspond with the taper of the nut, is seated upon a shoulder M' in the enlarged portion of the lower tube, and is laterally compressed by the movement of the nut L upon the upper tube so as to entirely prevent its movement in the lower tube, or to provide a sufficient amount of friction between the parts to make it possible to just move the parts on each other without any danger of the lamp's falling.

The soft tapered washer M composed of porous felt, which is inserted in the large tapered opening W in the nut L engages with the polished inner section B and make it possible for the nut to be revolved and adjusted without scratching or injuring the high polish of the inner section.

A slight turn of the nut L will provide for the necessary amount of friction.

The inner tube H is secured at its upper end in a coupling member O which rests upon the socket P in which the reflector Q is secured.

The bulb R is attached to the aforesaid coupling or reducing membr O as shown in Fig. 2. When the nut K is tightened the inner tube will be rigidly clamped between the nut K and the socket P.

The cord S passes through the tubes H in the inner section, and the body of the outer section and through the short tube D and finally passes freely out of the base through a rigid laterally curved tube T and sleeve U and nut V which make it possible for the cord to be pulled in or out without friction or injury to the wrapping of the cord. Ornamental molded sleeves X and Y may be employed to cover all exposed joints thus making the lamp presentable and artistic in appearance.

Having described the invention what I claim as new and desire to secure by Letters Patent is:

1. In a collapsible lamp, in combination, outer and inner telescoping sections, a socket attached upon the upper end of said inner section, and a base member attached upon the lower end of said lower section, an inner tube connecting said inner section and socket and a lower inner tube connecting said outer section and base, spaced compressible upper and lower guides for said inner section, said upper guide being positioned at the upper end of said outer section, and said lower guide being positioned at the lower end of said inner tube, a laterally curved tubular guide in said base communicating with said lower inner tube, and a lamp cord passing through both said inner tubes and through said curved tubular guide.

2. In a lamp an upright standard composed of telescoping tubular sections, a base for the lower section and a lamp socket attached to the upper extremity of the upper section, an inner connecting tube for securing said lower section and base together, said base comprising a hollow shell, a lamp cord passing through said tubular sections, and a curved tube passing through said base section, through which said cord is movably guided to issue laterally from said base, said curved tube communicating with said lower connecting inner tube at its inner end.

3. In a collapsible lamp support, outer and inner tubular telescoping sections and a hollow base section secured to said outer section, an inner tube secured at its lower end to said inner section and projecting therebelow and having a lamp socket and a coupling member secured to its upper end, a lamp shade secured between said coupling member and the upper end of said inner section, and vertically spaced expansible bearings between said inner tube and said inner section and between said sections.

4. In a collapsible lamp support, outer and inner tubular telescoping sections and a hollow base section secured to said outer section, an inner tube secured at its lower end to said inner section and projecting therebelow and having a lamp socket and a coupling member secured to its upper end, a lamp shade secured between said coupling member and the upper end of said inner section, vertically spaced expansible bearings between said inner tube and said outer section and between said sections, a tube connecting said base and outer section, a coupling member therefor and a curved tube connecting the same with the outer wall of said base, and an electric cord from said lamp passing through all said tubes.

5. In a collapsible lamp stand or support, an outer tubular section and base therefor, an inner section telescoping therein and composed of concentric tubes, a head upon the lower end of the inner tube of the inner section, said head having an annular groove therein in which the lower end of the outer tube of said section is seated, an opposed coupling member comprising a lamp socket upon the upper end of said inner tube and a lamp shade enclosed between said coupling member and said inner section, and vertically spaced expansible bearings between said inner and outer sections.

6. In a collapsible lamp stand or support an outer tubular section and base therefor, an inner section telescoping therein and composed of concentric tubes, a head upon the lower end of the inner tube of the inner section, said head having an annular groove therein in which the lower end of the outer tube of said section is seated, an opposed coupling member and a lamp-socket therein upon the upper end of said inner tube and a lamp shade enclosed between said coupling member and said inner section, and vertically spaced upper and lower expansible bearings between said inner and outer sections, said upper bearing comprising a tapered porous washer, a conversely tapered nut engaged with said washer and with said outer section, and an annular shoulder on said outer section on which said washer rests, and the lower bearing comprising a washer of porous material upon said inner tube of said inner section and a clamping nut therefor adapted to compress the same upon said head into engagement with said outer section.

In testimony whereof I affix my signature.

MAX E. GOTTLIEB.